May 8, 1945.  J. R. ROCHÉ ET AL  2,375,326
AIRCRAFT PROPELLER
Filed July 18, 1942

INVENTORS
Jean René Roché
and Felix A. Roché
By Richard Van Buren
THEIR ATTORNEY Patented May 8, 1945

2,375,326

UNITED STATES PATENT OFFICE 2,375,326

AIRCRAFT PROPELLER

Jean René Roché, Dayton, Ohio, and Felix A. Roché, Hampton, Va.

Application July 18, 1942, Serial No. 451,418

2 Claims. (Cl. 170—173)

This invention relates to improvements in propellers for use on aircraft and the like, and is particularly directed to novel means for adapting wood or plastic propeller blades, or propeller blades made of other suitable materials for use in connection with variable pitch control mechanisms.

It is a well known fact that wood or plastic propeller blades for use on aircraft have many advantages over metal blades. For example, such blades are produced with a minimum of machinery and skilled labor, and materials for such blades are very abundant and easily obtainable, and furthermore, such materials do not require long and expensive processes of manufacture.

Moreover, propeller blades made of wood or plastic materials are not as subject to fatigue failure and excessive vibration tendencies as are metal blades, and furthermore, such blades being much lighter in weight than metal blades, do not have the excessive centrifugal and gyroscopic tendencies of metal blades, and therefore, permit the use of more compact and simpler pitch control mechanisms, very important factors in the design of efficient aircraft.

Likewise, in the case of large diameter propellers, non-metal again proves superior to metal as its lightness eliminates excessive fly-wheel and gyroscopic tendencies and makes possible the construction of an aircraft of superior ability to maneuver quickly and one that responds readily to the controls, both of which are very important factors in the design of fighting aircraft.

Another distinct advantage of wood or plastic propeller blades over metal is that their strength in tension together with their great internal friction have a damping effect on vibration and effectively overcome the transfer of vibrations from the aircraft engine to the propeller, a characteristic which is so inherent in metal propeller blades.

In the past, wood and plastic blades, with their many advantages, have not been successfully adapted to use in connection with pitch control mechanisms because no successful way has been found to connect the wood or plastic blades to the metal hubs or ferrules of the pitch control mechanisms, and it is the main object of this invention to provide new and novel means for securing wood or plastic propeller blades to the metal ferrules and hubs of variable pitch control mechanisms.

Another object of the present invention is the provision of new and novel means for adapting wood or plastic propeller blades for use in controllable pitch hubs.

Still another object is to supply efficient and economical means for securing wood or plastic propeller blades in the metal ferrules of pitch control mechanisms.

A further object is to provide means, including a metal sleeve with internal and external threads adapted to be threaded into a cylindrical groove in a wood or plastic propeller blade for connecting said blade to a pitch control mechanism.

With these and incidental objects in view, the invention includes certain novel features of construction and combinations of parts, the essential elements of which are set forth in appended claims, and a preferred form or embodiment of which is hereinafter described with reference to the drawing which accompanies and forms a part of this specification.

Description

The present invention is shown and will be described as adapted for use in connection with a wood propeller blade, however, it is to be understood that it is not desired to confine or restrict the invention to such use because it is obvious that said invention may be readily used with blades made of plastic or other suitable materials.

Figure 1:
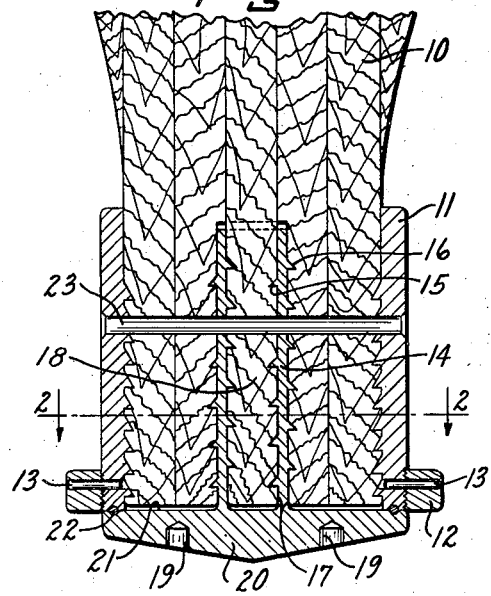
Fig. 1 is a cross-sectional view of one form of the present invention, showing the method of securing the shank of a wood or plastic propeller blade in the metal ferrule of a pitch control mechanism.
Figure 2:
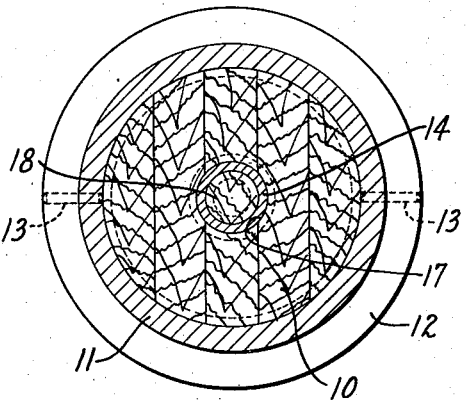
Fig. 2 is a sectional view taken along line 2—2 of Fig. 1, looking in the direction indicated by the arrows, showing in particular the manner in which the retaining sleeve is threaded into the cylindrical groove formed in the shank portion of the blade.
Figure 3:
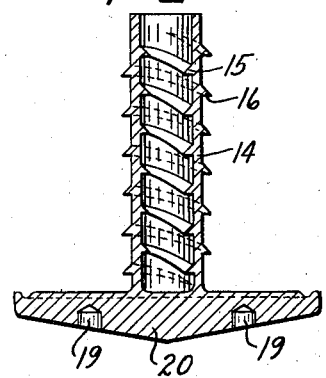
Fig. 3 is a cross-sectional view showing in detail the blade retaining member or sleeve.

Referring to Figs. 1, 2 and 3 of the drawing, the shank portion of the laminated wood propeller blade 10 is threaded, under considerable pressure, into a metal ferrule 11 of a pitch control mechanism, said ferrule 11 having threaded on the outside thereof a retaining ring 12, which is held against displacement by pins 13, and which in co-operation with a ball bearing of the thrust type (not shown) rotatably mounts the ferrule 11 in the hub of a suitable pitch control mechanism, not shown but well known in the art. Prior to threading the tenon of the propeller blade 10 into the ferrule 11, both the blade and the ferrule are coated with a suitable type of thermo-setting cement, which may afterward be set by any suitable means, such as the use of ultra high frequency radio waves.

After the shank of the propeller blade has been threaded into the ferrule 11, in the manner explained above, a sleeve-like retaining member, 14 (Figs. 1, 2 and 3) having suitable threads 15 and 16 of identical pitch in the internal circumference and on the external circumference thereof is threaded under suitable pressure into a cylindrical or ring-shaped groove 17 formed by the use of a suitable cutting tool in the center of the shank portion of the propeller blade 10. It will be noted that the cylindrical groove 17 forms a tenon 18, which is engaged by the internal thread 15 in the boring of the retaining sleeve 14 at the same time the external thread 16 threads into the external wall of said cylindrical groove 17.

If desired, internal and external threads to match the threads on the member 14, may be cut in the cylindrical groove 17 before the retaining sleeve 14 is threaded therein. However, another and probably just as satisfactory method of assembling the member 14 in the cylindrical groove 17, is to machine serrations in the threads 15 and 16, so as to form suitable cutting edges and suitable recesses for accumulating chips, so that said member 14 will cut its own threads in the cylindrical groove 17 as it is turned therein by means of a spanner wrench and properly spaced spanner wrench holes 19 in a head portion 20 of the member 14.

Before the retaining member 14 is threaded into the cylindrical groove 17, said groove is filled with a suitable type of thermo-setting cement, which, after said member 14 is securely threaded therein, may be set by the use of any suitable means, such as ultra high frequency radio waves.

It will be noted by referring to Figs. 1 and 3 that the internal and external threads 15 and 16 are shaped and spaced so as to provide maximum strength and holding ability without injuring an excessive number of active fibres in the shank portion of the blade 10.

The head portion 20 of the sleeve-like member 14 is of substantially the same diameter as the outside of the ferrule 11, and said head is conical-shaped so as to provide maximum strength to withstand the extreme pressure when the inside face of said head is screwed tightly against the lower face of the ferrule 11.

By referring to Fig. 1 it will be seen that clearance is provided at 21 between the inside face of the head 20 and the lower end of the shank of the propeller blade 10 so as to secure a desirable preloading effect between the member 14 and the ferrule 11, when the head 20 of said member 14 is screwed tightly against the lower face of said ferrule 11. Instead of the clearance at 21, another satisfactory method of preloading would be to force wedges between the inner face of the head 20 and the lower face of the ferrule 11.

A sealing ring 22 (Fig. 1) of some suitable material, is inserted in matching annular grooves in the lower face of the ferrule 11 and the head 20 of the sleeve 14, to seal the lower end of the shank portion of the blade 10 against moisture.

After the sleeve member 14 has been properly threaded into the cylindrical groove 17 in the shank of the blade 10 so that the head 20 firmly engages the lower end of the ferrule 11, as explained above, a hole is drilled through the entire assembly and a securing pin 23 is driven into said hole and riveted over on each end, as shown in Fig. 1, to further assist in securing the parts against displacement.

Figure 4:
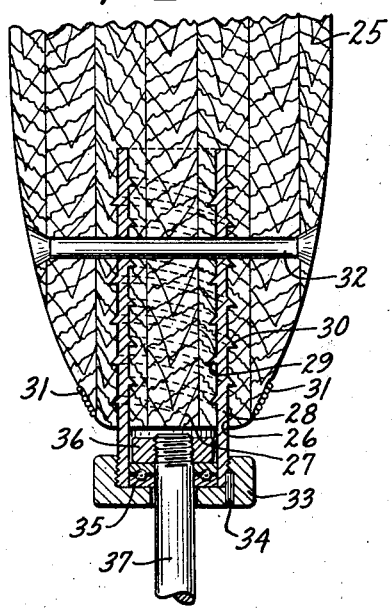
Fig. 4 is a cross-sectional view of of another form of the invention, in which an enlarged retaining sleeve takes the place of the metal ferrule shown in Fig. 1 and is used in its place to connect the propeller blade to the pitch control mechanism.

A modified form of the invention is disclosed in Fig. 4, in which reference numeral 25 represents the lower end of a laminated wood blade having a cylindrical groove 26 formed by any satisfactory method, in the lower end thereof, which groove forms a tenon 27. The cylindrical groove 26 is adapted to receive a sleeve 28 having internal threads 29 and external threads 30 of identical pitch, said threads adapted to be threaded, respectively, into the internal and external walls of the cylindrical groove 26 in exactly the same manner as described in connection with the retaining member 14, shown in Fig. 1, 2 and 3, and described above.

As in the preferred form, the threads 29 and 30 may be threaded into pre-formed threads in the cylindrical groove 26 or said threads may be serrated so as to form cutting teeth, and in this manner caused to cut their own threads in the cylindrical groove 26, when said sleeve 28 is turned therein.

Before the sleeve 28 is threaded into the cylindrical groove 26, a groove formed in the lower periphery of the blade 25 is filled with tightly wound wire wrapping 31 (Fig. 4) or a suitable metal band is inserted therein to reinforce the lower end of said blade to prevent splitting, and to insure that the threads 29 and 30 fit tightly and remain so, in the groove 26.

Prior to threading the sleeve 28 into the groove 26, said groove is filled with some suitable thermosetting cement which, after said sleeve is properly threaded into said groove, may be set in exactly the same manner as described in connection with the preferred form.

In the modified form (Fig. 4) desirable preloading may be obtained by screwing the upper end of the sleeve 26 tightly against the bottom of the cylindrical groove 26. After the sleeve 28 has been properly assembled in the groove 26, said sleeve may be further secured against displacement by means of a pin or a bolt 32 secured in a hole which passes through the blade 25, the sleeve 28, and the tenon 27.

The lower end of the sleeve 28 (Fig. 4) is threaded to receive mating threads on a retaining ring 33 secured against displacement by means of one or more pins 34 driven in holes which equally transverse the periphery of the sleeve 28 and the ring 33. The retaining ring 33 also retains a ball thrust bearing 35, which fits snugly in the bore of the sleeve 28, in proper relationship to a nut 36 threaded on the upper end of an axle 37, which rotatably supports the blade 25 for pitch control movement.

The ring 33 of the modified form, performs the same function as the ring 12 of the preferred form (Figs. 1 and 4) in that it is used for mounting the blade assembly in the pitch control mechanism.

The retaining sleeve 28 of the modified form, which is much larger than the sleeve 14 of the preferred form, does away entirely with the use of the metal ferrule 11 and thereby provides many advantages. For example, doing away with the metal ferrule 11 reduces substantially the overall weight of the blade, thus reducing to an appreciable degree the centrifugal thrust load and the gyroscopic tendencies of the blade and at the same time improving the pitch-control characteristics thereof. Another advantage is that the plan-form development of the blade may be carried to the extreme end thereof, thus greatly improving the aerodynamic form of the blade and doing away with the club-shaped shank portions of conventional blades with their many disadvantages.

As previously explained, the two forms of the present invention are shown as used in connection with laminated wooden propeller blades. However, it is not the desire to limit the invention to such use as it may be used equally as well in connection with plastic or other types of molded non-metal propeller blades without departing from the spirit and scope of the invention.

While the forms of mechanisms herein shown and described are admirably adapted to fulfill the objects primarily stated, it is to be understood that it is not intended to confine the invention to the forms or embodiments herein disclosed for it is susceptible of embodiments in various other forms, all coming within the scope of the claims which follow:

What is claimed is:

1. A non-metallic propeller blade comprising, in combination, a round shank portion with threads formed thereon; a metal ferrule having internal threads engaged by the threads on the shank to securely connect said parts; a cylindrical groove in the shank portion, said groove having threads of identical pitch formed in the internal and external circumferences thereof; a metal retaining member having a sleeve-like tubular portion and an enlarged head of substantially the same outside diameter as the ferrule; threads of identical pitch formed in the internal and external circumferences of the tubular portion, said threads engageable with the corresponding matching threads in the cylindrical groove so that said tubular portion may be threaded into said cylindrical groove until the enlarged head firmly engages the lower edge of the ferrule, to assist said ferrule in absorbing the outward thrust load of the blade; and means to secure the ferrule, the blade, and the retaining member against relative rotation.

2. A mounting for a non-metallic propeller blade comprising in combination a metal internally threaded ferrule for engaging similar external threads on the shank portion of the blade; a cylindrical groove formed in the shank portion, said groove forming a tenon; a metal retaining member having a sleeve-like tubular portion and an enlarged head portion, said head portion substantially the same outside diameter as the ferrule; threads of identical pitch formed on the internal and external circumferences of the tubular portion of the member for simultaneously threading onto the tenon and into the outer wall of the cylindrical groove until the enlarged head portion of the member firmly engages the lower edge of the ferrule, to assist said ferrule in absorbing the thrust load of the blade; and means to secure the ferrule, the blade, and the member against relative rotation.

JEAN RENÉ ROCHÉ.
FELIX A. ROCHÉ.